United States Patent [19]

LeGrand et al.

[11] 4,161,469

[45] Jul. 17, 1979

[54] POLYALKYLENE TEREPHTHALATE AND ORGANOPOLYSILOXANE-POLYCARBONATE BLOCK COPOLYMER BLENDS

[75] Inventors: Donald G. LeGrand, Burnt Hills; Albert F. Yee, Schenectady, both of N.Y.

[73] Assignee: General Electric Company, Schenectady, N.Y.

[21] Appl. No.: 868,023

[22] Filed: Jan. 9, 1978

[51] Int. Cl.² .................. C08L 67/02; C08L 69/00; C08L 83/06
[52] U.S. Cl. .................................. 260/40 R; 525/439
[58] Field of Search ........................ 260/824 R, 40 R

[56] References Cited

U.S. PATENT DOCUMENTS

| 3,686,355 | 8/1972 | Gaines et al. | 260/824 R |
| 3,884,858 | 5/1975 | Morawetz | 260/824 R |

FOREIGN PATENT DOCUMENTS 1136490  9/1962  Fed. Rep. of Germany ...... 260/824 R

OTHER PUBLICATIONS

Brandrup, J. et al., Polymer Handbook (1966) Interscience Publishers, pp. IV 359 & IV 361.

*Primary Examiner*—Wilbert J. Briggs, Sr.
*Attorney, Agent, or Firm*—F. Wesley Turner; Joseph T. Cohen; Charles T. Watts

[57] ABSTRACT

A blend comprising a polyalkylene terephthalate resin and an organopolysiloxane-polycarbonate block copolymer having improved impact and heat distortion properties. The polymer blends can be molded or formed into films, sheets, fibers, laminates, or other improved molded articles of manufacture including reinforced articles by conventional techniques.

10 Claims, No Drawings

POLYALKYLENE TEREPHTHALATE AND ORGANOPOLYSILOXANE-POLYCARBONATE BLOCK COPOLYMER BLENDS

CROSS REFERENCE TO RELATED APPLICATIONS

This invention is related to subject matter disclosed in the copending U.S. applications Ser. Nos. 868,021, 867,985, and 869,109, filed on Jan. 9, 1978; Jan. 9, 1978, and Jan. 13, 1978 respectively. All of the aforesaid applications are assigned to the same assignee of this application. All of the disclosures referenced therein are incorporated herein in their entirety by reference.

BACKGROUND OF THE INVENTION

1. Field of the Invention

This invention relates to polymer blends comprising a polyalkylene terephthalate resin and an organopolysiloxane-polycarbonate block copolymer. The polymer blends have improved mechanical properties based on the impact values greater than the impact values associated with polyalkylene terephthalate resins and heat distortion values at least equal to about the heat distortion temperature of the polyalkylene terephthalate resin component of the blends.

2. Description of the Prior Art

Polyalkylene terephthalate resins are well-known to those skilled in the art including their various associated physical and chemical characteristics as reported in numerous U.S. patents, e.g., U.S. Pat. Nos. 3,047,539, 2,465,319, etc., among others, as well as polyalkylene terephthalate resins described in the Encyclopedia of Polymer Science and Technology, Vol. II, entitled *Polyesters*, pages 62–128, Interscience Publishers (1969), which disclosures are incorporated herein in their entirety by reference.

Organopolysiloxane-polycarbonate block copolymers are also well-known to those skilled in the art and are described in various U.S. and foreign patent applications including U.S. Pat. No. 3,821,325 (Merritt, Jr. et al.) issued June 28, 1974; U.S. Pat. No. 3,419,635 and U.S. Pat. No. 3,419,634 (both of Vaughn, Jr.) both issued Dec. 31, 1968; U.S. Pat. No. 3,832,419 (Merritt, Jr.) issued Aug. 27, 1974 and U.S. Pat. No. 3,189,662 (Vaughn, Jr.) issued June 15, 1965, among others.

Heretofore, to the best of the knowledge of applicants, blends of polyalkylene terephthalate resins and organopolysiloxane-polycarbonate block copolymers having improved mechanical properties have not been reported by the prior art.

DESCRIPTION OF THE INVENTION

This invention embodies polymer blends comprising a polyalkylene terephthalate resin and an organopolysiloxane-polycarbonate block copolymer having improved impact and heat distortion properties.

The "polyalkylene terephthalate resin" can be any resin comprising a high molecular weight poly(1,4-alkylene terephthalate) having repeating units of the general formula

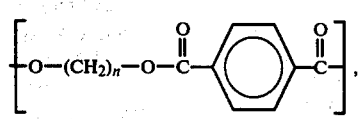

n being a number of from 1 to 50. The poly(1,4-alkylene terephthalate) resins can contain mixtures thereof, including copolyesters, i.e., esters that contain a minor amount, e.g., from about 0.5 to about 2% by weight, of repeating units derived from an aliphatic or another aromatic dicarboxylic acid and/or another aliphatic diol or polyol. Among the units which can be present in the copolyesters are those derived from aliphatic dicarboxylic acids, e.g., acids having up to about 50 carbon atoms, including cycloaliphatic, straight and branched chain acids, such as adipic acid, cyclohexanediacetic acid, dimerized $C_{16-18}$ unsaturated acids (which have 32 to 36 carbon atoms), trimerized such acids, and the like. Among the units in the copolyesters can also be minor amounts derived from aromatic dicarboxylic acids, e.g., acids having up to about 36 carbon atoms, such as isophthalic acid and the like. In addition to polybutylene terephthalate (PBT) units derived from 1,4-butylene glycol, there can also be minor amounts of units derived from other aliphatic glycols and polyols, e.g., di- and polyols having up to about 50 carbon atoms, including ethylene glycol, propylene glycol, cyclohexanediol, and the like. Such copolyesters can be made by techniques well known to those skilled in the art including techniques taught by Winfield et al., U.S. Pat. No. 2,465,319; Pengilly, U.S. Pat. No. 3,047,539, among others.

Illustratively, presently preferred PBT resin blend components have an intrinsic viscosity, when employed in blends containing nonreinforcing and reinforcing fillers, of at least 1.0 and at least 0.2 deciliters pr gram (dl./g.), respectively, as measured in o-chlorophenol, a 60/40 phenol-tetrachloroethane mixture or a similar solvent at 25–30° C. The upper intrinsic viscosity limit is not critical, however will generally be about 2.5 dl./g. Presently preferred PBT resin blend components will have intrinsic viscosity within the ranges of from about 1.1 to about 1.5 when employed in either nonreinforced or reinforced blends.

The "organopolysiloxane-polycarbonate block copolymer" can be any copolymer comprising organopolysiloxane-polycarbonate blocks having repeating units of the general formulae:

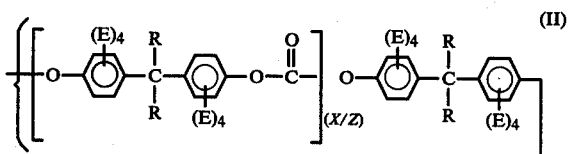

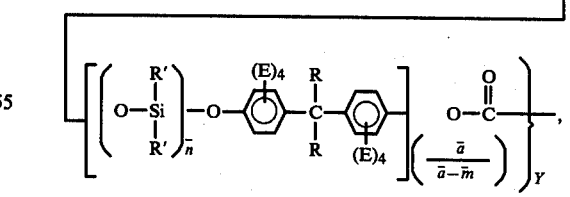

where X is an integer equal to 1 to 1000, inclusive, preferably 2 to 100, $\bar{n}$ is a number average equal to 1 to 100, inclusive, preferably 5 to 40, $\bar{a}$ is a number average equal to 1.1 to 100, $\bar{m}$ is equal to 1, and Z is an integer equal to 1 to 1000, inclusive, preferably 5 to 12. E, R, and R' being as defined hereinafter.

Illustrative of well known organopolysiloxane-polycarbonates are described by the following general formulae:

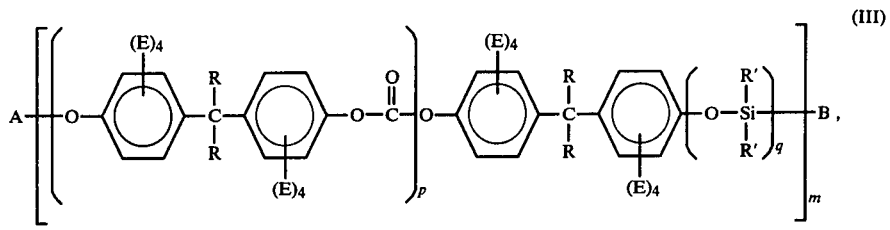

where m is at least 1, and preferably m is an integer equal to from 1 to about 1,000, inclusive, p is equal to from 1 to about 200, inclusive, q is equal to from about 5 to about 200, inclusive, and preferably q has an average value from about 10 to about 90, inclusive, while the ratio of p to q can vary from about 0.005 to about 40, inclusive. B is

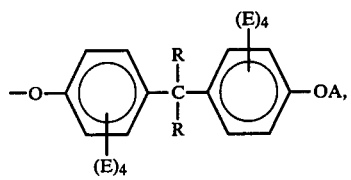

A is a member selected from the class of hydrogen and

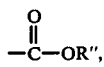

R is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals and cyanoalkyl radicals, R" is a member selected from the class consisting of monovalent hydrocarbon radicals and halogenated hydrocarbon radicals, and E is a member selected from the class of hydrogen, lower alkyl radicals and halogen radicals and mixtures thereof.

Included within the radicals represented by R of Formulas II and III are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl propyl, chlorobutyl, cyclohexyl, etc.; R can be all the same radical or any two or more of the aforementioned radicals, while R is preferably methyl, R' includes all radicals included by R above except hydrogen, where R' also can be all the same radical or any two or more of the aforementioned R radicals except hydrogen and R' is preferably methyl. R' also includes, in addition to all the radicals included by R, except hydrogen, cyanoalkyl radicals such as cyanoethyl, cyanobutyl, etc., radicals. Radicals that are included within the definition of E of Formulas II and III are hydrogen, methyl, ethyl, propyl, chloro, bromo, iodo, etc., and combinations thereof, and E is preferably hydrogen.

The organopolysiloxane-polycarbonate block copolymers can be made by any technique known to those skilled in the art including the techniques described by Merritt, Merritt, Jr., et al., and Vaughn Jr. in the U.S. patents referenced in the description of the prior art hereinbefore. Accordingly, all of the procedures described in the aforesaid patents relating to methods for the preparation of the organopolysiloxane-polycarbonate block copolymers are incorporated herein in their entirety by reference.

Illustratively presently preferred organopolysiloxane-polycarbonate block copolymers contain repeating units of Formula II, set out herein before wherein X, Y. Z, a, n and m are as defined hereafter:

| Resin Type "A" | X equals ~ 7 |
| | Y equals ~ 8 to 10 |
| | Z equals ~ 1 |
| | a equals ~ 2 |
| | n equals ~ 10 |
| | m equals ~ 1 |
| Resin Type "B" | X equals ~ 10 |
| | Y equals ~ 8 to 10 |
| | Z equals ~ 1 |
| | a equals ~ 2 |
| | n equals ~ 20 |
| | m equals ~ 1 |
| Resin Type "C" | X equals ~ 5 |
| | Y equals ~ 8 to 10 |
| | Z equals ~ 1 |
| | a equals ~ 2 |
| | n equals ~ 20 |
| | m equals ~ 1 |

Blends of polyalkylene terephthalate resins and organo polysiloxane-polycarbonate block copolymers comprise blends of any proportion of the aforesaid resins and copolymers. In general, the presently preferred blend contains at least one percent of an organopolysiloxane-polycarbonate block copolymer. Even more preferably are compositions wherein the organopolysiloxane-polycarbonate block copolymer component is present in an amount of at least about 2-50 percent, and more preferably from about 5-30 percent by weight of the composition.

Since the relative proportions of organopolysiloxane-polycarbonate block copolymers relative to the polyalkylene terephthalate resin effect the physical characteristics of the composition—of the heat distortion temperature (HDT) as well as the impact properties, the preferred range as set out above have been selected since optimum heat distortion and impact properties are generally obtained within the preferred proportions noted above.

A presently preferred blend composition of a polyalkylene terephthalate resin and an organopolysiloxane-polycarbonate block copolymer contains a reinforcing amount of a reinforcing filler. In general, any reinforcing agent can be used, e.g., fibers, whiskers or platelets of metals, e.g., aluminum iron or nickel and the like, and nonmetals e.g., ceramics, carbon filaments, silicates, asbestos, titanium dioxide and titanate whiskers, quartz or glass flakes and fibers and the like. It is to be understood that, unless the filler adds to the strength, stiffness and impact strength of the polymer blends, it is only an extending filler and not a reinforcing filler by definition as contemplated herein.

Although it is not necessary, it is beneficial to have a reinforcing agent present in the compositions in order to obtain the HDT values desired in many mechanical applications, e.g., applications requiring HDT values within the range of from about 130 to 420° F., or even higher. Presently preferred reinforced compositions contain from about 1 percent to about 50 percent, or higher, more preferably from about 5 percent to about 40 percent, and more preferably from about 10 percent to about 30 percent by weight of a reinforcing agent based on total weight of the blend compositions—including the weight of reinforcing agent.

In particular, the preferred reinforcing fillers are of glass, more preferable fibrous glass filaments comprised of lime-aluminum borosilicate glass that is relatively soda free (commonly known as "E" glass) which is used where electrical properties are important. The filaments can be made by any standard process, e.g., by steam or air blowing, flame blowing and mechanical pulling.

Any of the methods well known to the art can be employed in the preparation of the compositions of this invention. Illustrative techniques include mixing of polyalkylene terephthalate (PAT) resin and organopolysiloxane-polycarbonate block copolymer (PS-PC) in powder or granular form, extruding and shaping into pellets or other suitable forms. Any reinforcing agent or any other additive can be added to a PAT and PS-PC composition in any conventional manner, e.g., dry mixing, hot melt mixing, etc., employing an extruder, a heated mill or any other mixing device, such as a Banbury mixer.

The compositions can be molded with any equipment conventionally used for unreinforced or reinforced thermoplastic compositions. For example, good results can be obtained using conventional molding machines, which employ plungers or reciprocating-screws, etc., conventional molding temperatures, e.g., about 450°-500° F., and conventional mold temperatures, e.g., 150° F.

In order that those skilled in the art may better understand our invention, the following examples are given which are illustrative of the best mode of this invention, however, these examples are not intended to limit the invention in any manner whatsoever. In all the examples, the compositions were prepared in accordance with the following general procedure. Also, in all of the examples, all parts are by weight unless otherwise stated.

GENERAL PROCEDURE

A series of blends were prepared from commercially available materials comprising (A) poly(1,4-butylene terephthalate) having an intrinsic viscosity of 0.8 dl./g., measured at 25° C. in hexafluoroisopropanol, and (B) an organopolysiloxane-polycarbonate block copolymer having an intrinsic viscosity within the range of 0.5 to 1.5 dl./g., measured at 25° C. in chloroform or methylene chloride, by dry blending and pre-compounding in a hot melt extruder. The extrudate was pelletized. For comparative purposes, compositions containing only poly(1,4-butylene terephthalate) were also prepared in pellet form. The resin and copolymer blends, and control compositions were separately molded into appropriate test shapes, e.g., bars, rods, etc.

EXAMPLE I

Several combinations of polybutylene terephthalate and polysilicone-polycarbonate block copolymer both unfilled (free of many glass fibers) and filled (containing glass fiber) were blended at 500° F. in a one-inch diameter Wayne single screw extruder with a 25:1 l/d fitted with a 3:1 compression screw. The blends were extruded at a rate of 4 to 6 kilograms per hour. The extruded blends were injection molded under nominally identical conditions. After drying at 125° C. for 3-6 hours the blends were plasticized at 500° F. and injected into appropriate mold samples at 150° F. A summary of the mechanical properties of the blends with the proportions of the polybutylene terephthalate and polysilicone-polycarbonate block copolymer are set out in Table IA and IB which follow:

TABLE IA

Properties of Polybutylene Terephthalate Blended with Polysiloxane-Polycarbonate Block Copolymer

| Run No. | COMPOSITION Unfilled(c) | Izod Impact Notched (ft lbs/in) (a)* | (b)** | Strength Unnotched (ft lbs/in) (a) | (b) | Tensile Yield Stress (PSI) (a) | (b) | Flexural Modulus ($10^5$ PSI) (a) | (b) | Flexural Yield Strength (PSI) (a) | (b) | HDT 264 psi (°F.) (a) | (b) | Oxygen Index (a) | (b) |
|---|---|---|---|---|---|---|---|---|---|---|---|---|---|---|---|
| 1. | Control 0%LR | 0.80 | 0.80 | N.B.# | N.B. | 6,770 | 6,770 | 3.54 | 3.54 | 12,990 | 12,900 | 129 | 129 | 21.2 | 21.2 |
| 2. | 1%LR | 0.83 | 0.92 | " | " | 6,710 | 6,780 | 3.43 | 3.51 | 12,300 | 12,700 | 126 | 126 | 19.2 | 18.7 |
| 3. | 2%LR | 0.84 | 1.10 | " | " | 6,390 | 6,410 | 3.34 | 3.37 | 12,300 | 12,500 | 127 | 129 | 18.3 | 19.2 |
| 4. | 5%LR | 0.97 | 1.52 | " | " | 6,020 | 5,870 | 3.18 | 3.14 | 11,400 | 11,300 | 127 | 127 | 18.7 | 19.6 |
| 5. | 10%LR | 1.21 | 1.51 | " | " | — | — | 2.93 | 2.93 | 11,000 | 10,600 | — | — | 20.0 | 21.2 |
|  | 10% Glass(d) | | | | | | | | | | | | | | |
| 6. | Control 0%LR | 0.84 | 0.84 | 10.3 | 10.3 | 10,400 | 10,400 | 5.23 | 5.23 | 18,000 | 18,000 | 334 | 334 | 19.6 | 19.6 |
| 7. | 1%LR | 1.00 | 1.11 | 8.96 | 12.3 | 10,900 | 10,600 | 5.39 | 4.98 | 18,700 | 17,600 | 334 | 329 | 20.0 | 20.0 |
| 8. | 2%LR | 1.00 | 1.54 | 10.7 | 13.4 | 11,000 | 10,300 | 5.26 | 5.18 | 18,700 | 17,800 | 336 | 329 | 20.4 | 20.0 |
| 9. | 5%LR | 1.51 | 2.06 | 14.4 | 13.4 | 10,500 | 9,870 | 4.99 | 4.95 | 17,300 | 16,500 | 325 | 325 | 22.4 | 23.2 |
| 10. | 10%LR | 2.13 | 2.45 | 14.1 | 13.2 | 10,600 | — | 4.81 | 4.67 | 15,800 | 15,900 | 315 | — | 25.4 | 23.6 |
| 11. | 15%LR | 2.61 | — | 14.4 | — | 9,220 | — | 4.16 | — | 14,300 | — | — | — | 23.6 | — |

*Blends containing LR-3320 (polysiloxane-polycarbonate block copolymer) ~Resin Type "A"
**Blends containing LR-5630 (polysiloxane-polycarbonate block copolymer) ~Resin Type "C"
Specimen did not beak with an impact of 32 ft. lbs./in.
(c)Unfilled = no fiber glass reinforcement
(d)10% Glass = 10% by weight fiber glass based on the combined weight of fiber glass Valox® 310 (PBT) and LR-3320 or LR-5630

TABLE IB

| | Composition wt. % | | | Izod Impact Strength (ft lbs/in) | | Tensile Strength | Flexural Properties | | HDT 264 PSI | Oxygen |
|---|---|---|---|---|---|---|---|---|---|---|
| Run No. | Glass[a] | LR[b] 5630 | Valox® 310 | (Notched) | (Unnotched) | (PSI) | Modulus (PSI) | Strength (PSI) | (°F.) | Index |
| 10. | 30 | 0 | 70 | 2.33 | 16.5 | 17,600 | $1.09 \times 10^6$ | 28,600 | 399 | 19.2 |
| 11. | 30 | 2 | 68 | 2.56 | 16.3 | 17,000 | $1.11 \times 10^6$ | 27,600 | 403 | 23.2 |
| 12. | 30 | 5 | 65 | 3.33 | 19.0 | 16,600 | $1.02 \times 10^6$ | 26,200 | 403 | 23.2 |
| 13. | 30 | 10 | 60 | 3.75 | 14.8 | 14,600 | $8.93 \times 10^5$ | 22,400 | 403 | 24.0 |
| 14. | 30 | 15 | 55 | 4.21 | 13.1 | 11,100 | $7.47 \times 10^5$ | 17,100 | 401 | 24.0 |

Properties of 30% Glass Reinforced Polybutylene Terephthalate Blended with Polysiloxane-Polycarbonate Block Copolymer

[a] Glass = fiber glass
[b] LR-5630 = polysiloxane-polycarbonate block copolymer
[c] Valox® 310 = polybutylene terephthalate The polyalkylene terephthalate resin and organopolysiloxane-polycarbonate block copolymers, both reinforced and unreinforced as defined herein, can be injection, compression and transfer molded into various shaped articles of manufacture, e.g., automotive and appliance utilized articles, extruded to produce films, and other forms having complicated cross-sections as well as cross head extruded hoses, wires, cables and other substrate covers.

We claim:

1. A polymer blend comprising a polyalkylene terephthalate resin and an organopolysiloxane-polycarbonate block copolymer having impact values greater than the impact value of the polyalkylene terephthalate resin component of the blend.

2. The claim 1 blend, wherein, on a weight basis, the ratio of said resin to said copolymer is from 99:1 to 1:99.

3. The claim 2 blend, wherein said ratio is from 98:2 to 50:50.

4. The claim 3 blend, wherein said ratio is from 95:5 to 70:30.

5. The claim 4 blend, further comprising a reinforcing amount of a reinforcing filler and wherein said resin has an intrinsic viscosity of at least 0.2 dl./g.

6. The claim 5 blend, wherein said filler is a fibrous glass filament.

7. The claim 1 blend, wherein the heat distortion temperature is at least comparable to the heat distortion temperature of said resin.

8. The claim 1 blend, wherein said copolymer is of the formula:

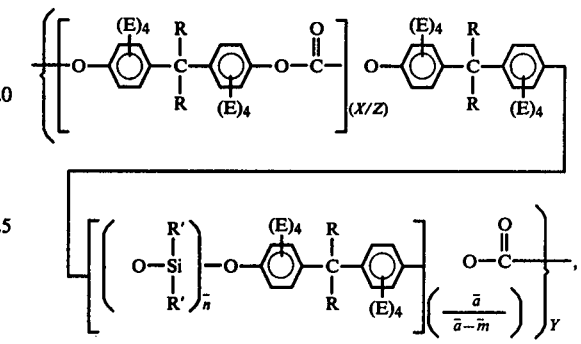

where X is an integer equal to 1 to 1000, inclusive, preferably 2 to 100, $\bar{n}$ is a number average equal to 1 to 100, inclusive, preferably 5 to 40, $\bar{a}$ is a number average equal to 1.1 to 100, $\bar{m}$ is equal to 1, and Z is an integer equal to 1 to 1000, inclusive, preferably 5 to 12, E is a member selected from the class of hydrogen, lower alkyl radicals and halogen radicals and mixtures thereof, R is a member selected from the class of hydrogen, monovalent hydrocarbon radicals and halogenated monovalent hydrocarbon radicals, and R' is a member selected from the class of monovalent hydrocarbon radicals, halogenated monovalent hydrocarbon radicals and cyanoalkyl radicals.

9. The claim 7 blend wherein X equals ~ 7; Y equals ~ 8 to 10; Z equals ~ 1; $\bar{a}$ equals ~ 2; $\bar{n}$ equals ~ 10; and $\bar{m}$ equals ~ 1.

10. The claim 7 blend wherein X equals ~ 10; Y equals ~ 8 to 10; Z equals ~ 1; $\bar{a}$ equals ~ 2; $\bar{n}$ equals ~ 20; and $\bar{m}$ equals ~ 1.

* * * * *